Feb. 13, 1962  R. V. ALBERTSON ETAL  3,020,918
PARTS WASHER
Filed Nov. 3, 1960  2 Sheets-Sheet 1

INVENTORS
ROBERT V. ALBERTSON
VICTOR N. ALBERTSON
BY
*Merchant & Merchant*
ATTORNEYS Feb. 13, 1962  R. V. ALBERTSON ETAL  3,020,918
PARTS WASHER
Filed Nov. 3, 1960  2 Sheets-Sheet 2

INVENTORS
ROBERT V. ALBERTSON
VICTOR N. ALBERTSON
BY
Merchant & Merchant
ATTORNEYS

United States Patent Office 3,020,918
Patented Feb. 13, 1962

3,020,918
PARTS WASHER
Robert V. Albertson and Victor N. Albertson, Minneapolis, Minn., assignors, by mesne assignments, to Practical Mfg. Co., Minneapolis, Minn., a corporation of Minnesota
Filed Nov. 3, 1960, Ser. No. 67,124
2 Claims. (Cl. 134—98)

This invention relates generally to apparatus for cleaning and washing machinery parts, and more particularly it relates to a parts washer adapted to alternately wash and rinse dirty machinery parts.

Generally, this invention comprises an open-topped cabinet which is adapted to receive dirty machinery parts and alternately wash and rinse them with a cleaning solution.

An object of this invention is the provision of a parts washer which is provided with a washing container into which a washing solution is introduced in such manner as to impart a turbulent agitation to the cleaning solution within the container.

Another object of this invention is the provision of a parts washer which is adapted to supply either non-filtered cleaning solution to a washing container or filtered cleaning solution to a rinsing nozzle disposed above the washing container for rinsing the parts after they have been removed from the washing container.

Another object of this invention is the provision of a parts washer which is extremely efficient in performing its function of washing and rinsing accumulations of carbon, scale, grease, road oil, gum, grime, and other accumulations of foreign matter from machinery parts.

A still further object of this invention is the provision of a parts washer which is adapted to supply a continuously filtered cleaning solution to the rinsing nozzle thereof so as to prolong the reusable life of the cleaning solution without loss of efficiency.

Another object of this invention is the provision of a parts washer which contains filtering means which includes an instantly accessible and replaceable filtering element.

Other objects of this invention reside in the provision of a parts washer which is economical to manufacture, very effective in reducing shop operating costs, advantageous in its ancillary provision of clean tools and a clean and neat shop, strong and durable throughout the continued use, and extremely efficient in the vindication of its purposes.

The above and still further objects of this invention will become apparent from the following detailed specification, appended claims and attached drawings.

Referring to the drawings, wherein like reference characters indicate like parts or elements throughout the several views.

Figure 1:
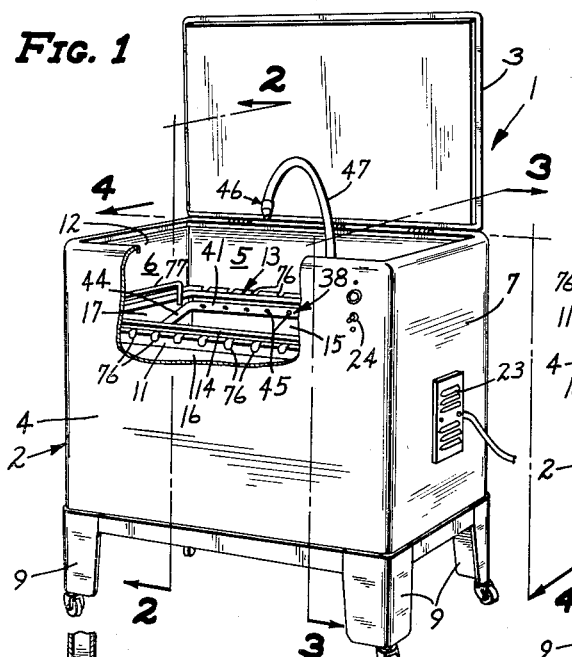
FIG. 1 is a view in perspective of our parts washer.

Referring with greater particularity to the drawings, the reference numeral 1 represents our novel parts washer in its entirety, which is contained within and includes the open topped cabinet, represented in general by the reference numeral 2. The cabinet 2 comprises a hinged top 3, a front wall 4, a back wall 5, end walls 6, 7, a bottom wall 8, and caster-equipped legs 9 for supporting the cabinet 2 in the conventional manner. The front wall 4, back wall 5, end walls 6, 7, and bottom wall 8 of the cabinet 2 define a sump 10 which is adapted to contain a cleaning solution, not shown, which may be of any conventional type used in removing carbon, grease, grime, etc.

A generally annular angle support 11 is secured to the interior 12 of the cabinet 2 generally intermediate the top 3 and bottom wall 8 thereof. The angle support 11 is adapted to carry a box-like open topped washing container, represented in general by the reference numeral 13, which defines a laterally outwardly extending peripheral flange 14 which rests upon the angle support 11. The washing container 13 comprises a back wall 15, a front wall 16, end walls 17, 18, and a bottom wall 19, the latter of which is equipped with a conventional drain and plug 20. The washing container 13 is adapted to contain a portion of the cleaning solution, not shown, for washing dirty machinery parts, such as automobile parts, not shown, which are placed within the washing container 13.

For the purpose of recirculating the cleaning solution from the sump 10 to the washing container 13, a conventional jet pump 21 is disposed within the cleaning solution contained in the sump 10. The pump 21 is driven by an electric motor, not shown, which is contained within the motor housing 22, which is secured to the end wall 7 of the cabinet 2, the end wall 7 being ventilated as at 23. It is noted that the end wall 18 of the washing container 7 is spaced substantially from the end wall 7 of the cabinet 2 so as to permit the disposition of an access to the motor housing 22. The front wall 4 of the cabinet 2 is provided with a conventional switch 24 for energizing the pump driving motor, not shown. By reference particularly to FIGS. 3 and 4, it will be shown that the pump 21, which is equipped with a conventional filter screen 25, is connected to the washing container 13 by means of a conduit, represented in general by the reference numeral 26. It should be noted that the conduit 26 has a combination valve and filter mount, represented in general by the reference numeral 27, interposed therein and secured to the motor housing 22, the purpose of the valve and filter mount 27 being particularly set forth hereinafter. The conduit 26 is comprised of conventional pipe fittings, including the nipples 28 and elbows 29, in addition to an expansion section 30 and the upwardly removable slip fitting, represented in general by the reference numeral 31. The slip fitting 31 comprises an upwardly opening female sleeve 32 secured to the elbow 29, and an elbow 33, the lower end of which defines a male connector 34 which is received within the female sleeve 32 and the other end 35 of which is rigidly secured to the washing container 13. It will be noted by referring to FIG. 5, that the female sleeve 32 defines a circumferential recess 36, which is adapted to receive an O-ring 37 for sealing the connection when the elbow 33 is received within the female sleeve 32.

Figure 2:
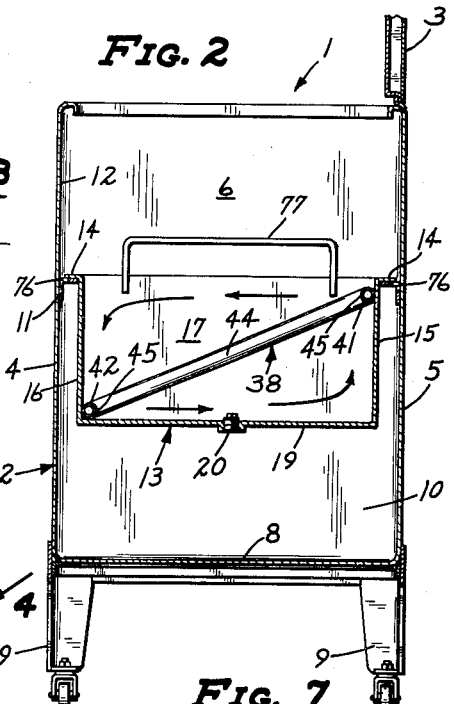
FIG. 2 is an enlarged view in vertical section taken on the line 2—2 of FIG. 1, some parts being broken away.
Figure 4:
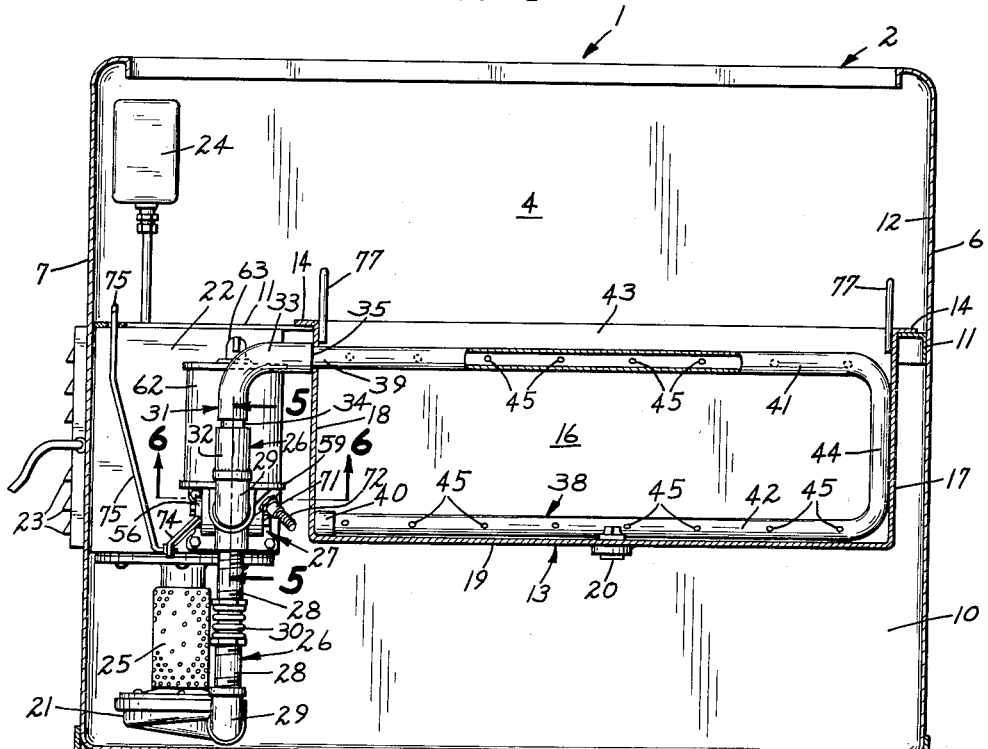
FIG. 4 is a further enlarged view in vertical section taken on the line 4—4 of FIG. 1, some parts being broken away.

FIGS. 2 and 4 disclose an important part of our invention wherein a generally tubular generally U-shaped cleaning solution distributing element, represented in general by the reference numeral 38, is shown. The distributing element 38 is received within the washing container 13 with one of its ends 39 being connected to the end 35 of the elbow 33 at the end wall 18 of the washing container 13, and the other end being closed with the pipe cap 40. In accordance with my invention, the distributing element 38 defines integrally connected elongated portions 41, 42 respectively which are disposed on opposite sides of the washing container 13. One of the elongated portions 41 is disposed adjacent the top 43 near the back wall 15 of the washing container 13 and the other of the elongated portions 42 is disposed adjacent the bottom wall 19 near the front wall 16 of the washing container 13. It will be noted that the elongated portions 41, 42 of the distributing element 38 are connected by a transversely inclined portion 44 of the distributing element 38. The elongated portions 41, 42 of the distributing element 38 define longitudinally spaced cleaning solution outlet orifices 45, which open into the container 13 in a generally horizontally inwardly extending direction so as to create a turbulent agitation of the cleaning solution, not shown, within the washing container 13, as shown by the arrows in FIG. 2. It should be obvious that when the washing container 13 becomes filled with the cleaning solution, not shown, which is dispensed through the outlet orifices 45, the cleaning solution will overflow back into the sump 10 to be recirculated again.

For the purpose of providing a cleaning solution rinse of filtered cleaning solution, a rinsing nozzle, represented in general by the reference numeral 46, is disposed adjacent the top 3 of the cabinet 2 and is connected to the combination valve and filter mount 27, said connection being by means of suitable secondary conduit means, such as a flexible conduit 47, suitable couplings 48 and 48', and a hose 72 hereinafter described. The flexible conduit 47 is rotatably secured by means of the coupling 48 and the nuts 49 to the angle support 11, and is also secured to the back wall 5 of the cabinet 2 by means of the clamp 50. The above mentioned combination valve and filter mount 27 comprises a valve body portion 51 which is bolted or otherwise secured to the motor housing 22, as seen particularly in FIG. 4. The body portion 51 defines an inlet port 52, a first outlet port 53, a second outlet port 54, and a generally cylindrical plug-receiving chamber 55, which communicates with all of the ports 52–54. The chamber 55 is adapted to receive a generally cylindrical plug 56 which defines a generally transversely extending primary bore 57 and a secondary bore 58 which is generally normal to the primary bore 57, as seen particularly in FIG. 5.

Figure 7:
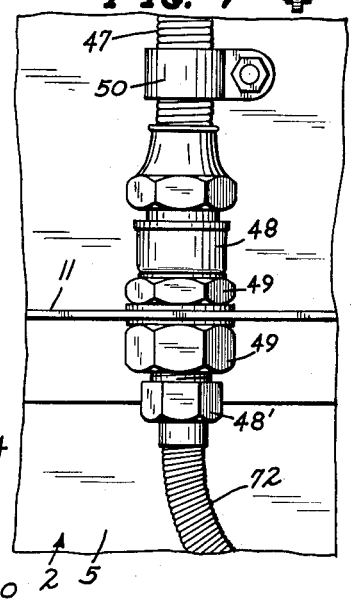
FIG. 7 is an enlarged detail view in elevation of a portion of the conduit leading to the rinsing nozzle, some parts being broken away.
Figure 6:
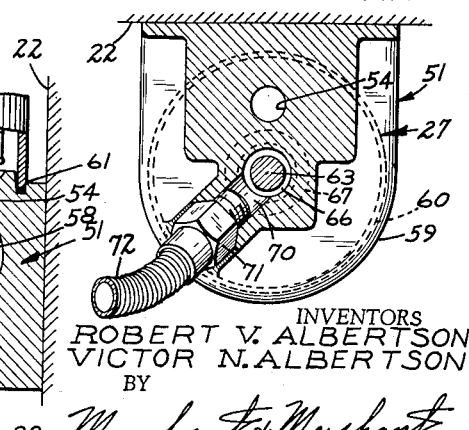
FIG. 6 is an enlarged detail view in horizontal section taken on the line 6—6 of FIG. 4, some parts being broken away.

The combination valve and filter mount 27 further defines an enlarged annular flange 59 which is integrally formed with the valve body portion 51 thereof, the flange 59 defining an annular recess 60, which receives the bottom 61 of the outer filter shell 62, the shell 62 being removably secured to the valve body portion 51 by means of the threaded stud 63 which is received within the generally centrally spaced aperture 64. It should be obvious that the filter shell 62 is adapted to receive a conventional filter cartridge 65 which is sealed about the filter outlet passage 66 by means of the sealing ring 67, the annular chamber defined intermediate the filter cartridge 65 and the outer filter shell 62 being represented by the reference numeral 68. It should be noted that the inlet port 52 is connected to the pump outlet 69, the first outlet port 53 is connected by means of the conduit 26 to the cleaning solution distributing element 38 so as to convey nonfiltered cleaning solution to the washing container 13, and the second outlet port 54 leads into the annular chamber 68, through the filter cartridge 65, and into the filter outlet passage 66. FIG. 6 shows the filtered cleaning solution outlet recess 70 which communicates with the filter outlet passage 66 and receives a conventional hose coupling 71 for a connection to the hose 72 which then is connected, by means of couplings 48 and 48' as shown in FIG. 7, to the flexible conduit 47 so as to bypass the cleaning solution, not shown, through the filter cartridge 65 before the cleaning solution is conveyed in the above described manner to the rinsing nozzle 46.

Figure 3:
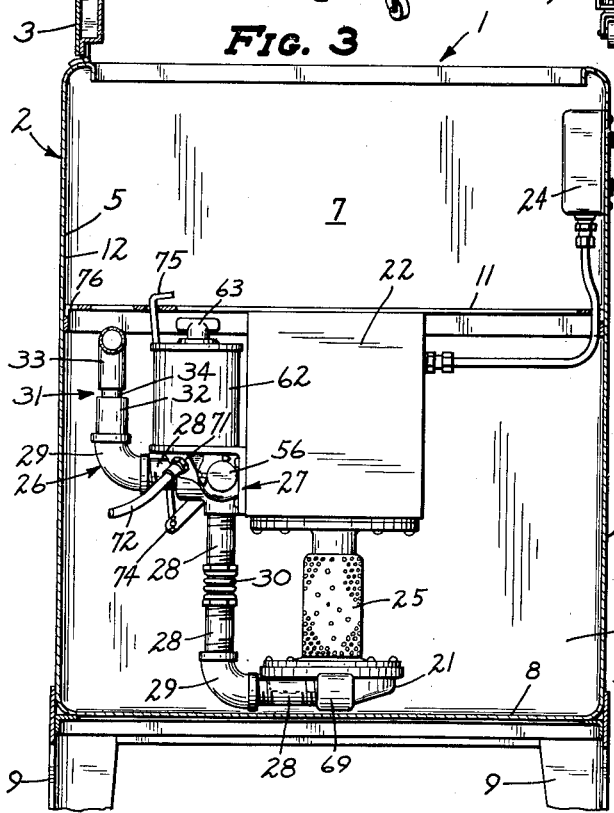
FIG. 3 is an enlarged view in vertical section taken on the line 3—3 of FIG. 1, some parts being broken away.
Figure 5:
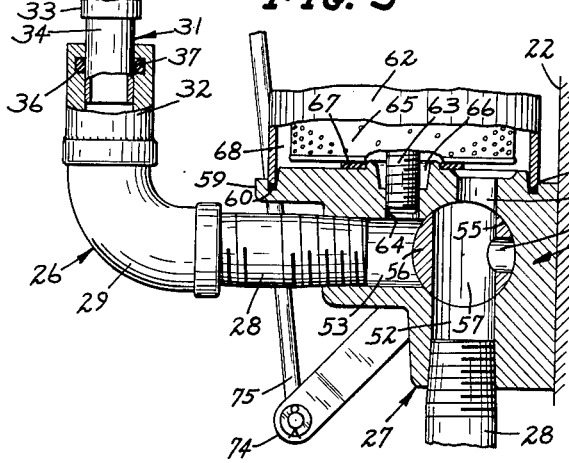
FIG. 5 is an enlarged detail view in vertical section taken on the line 5—5 of FIG. 4, some parts being broken away.

FIGS. 3–5 show the connection of the lever arm 74 and the upwardly extending control rod 75 to the valve plug 56 so as to provide means for imparting restricted circumferential movement to the valve plug 56. The control rod 75 projects through the angle support 11, and thereby provides easily accessible means for actuating the valve plug 56, which is thereby rendered movable between a washing position, not shown, wherein the cleaning solution is recirculated from the sump 10 to the washing container 13 and a rinsing position, shown in FIG. 5, wherein the cleaning solution is recirculated from the sump 10 through the filter cartridge 65 to the rinsing nozzle 46. It should be obvious that the cleaning solution dispensed from the rinsing nozzle 46 overflows through the plurality of apertures 76 defined in the angle support 11 back into the sump 10. The rinsing nozzle 46 has particular utility in rinsing machinery parts with filtered cleaning solution, the machinery parts, not shown, being held either in the drained washing container 13 or in any conventional holding apparatus, not shown, disposed elsewhere in the cabinet 2.

Having specifically described our invention, the operative simplicity thereof is thought to be easily understandable; however, briefly stated, the operation of our invention consists of placing the machinery parts to be cleaned in the washing container 13 after the sump 10 has been filled with cleaning solution, the washing container 13 also becoming filled with cleaning solution dispensed from the distributing element 38. FIG. 2 shows the turbulent circulatory agitation of the cleaning solution within the washing container 13 which is caused by the laterally oppositely opening orifices 45. The circulatory agitation of the cleaning solution within the washing container is highly beneficial in removing dirt, grease, oil, grime, etc. from the machinery parts. After the machinery parts have been sufficiently cleaned within the washing container 13, the latter is upwardly removed from the cabinet 2 by grasping the handles 77 thereof, the slip fitting 31 permitting the upward removal of the elbow 33 along with the container 13; and the machinery parts, not shown, are thereafter suspended by suitable means, such as a wire basket, not shown, within the upper portion of the cabinet 2, and are thereafter completely rinsed with the filtered cleaning solution dispensed from the rinsing nozzle 46, as described above. It should be obvious that a parts washer 1 of heretofore unknown efficiency in removing grease and grime, etc. has been shown and described.

This invention has been thoroughly tested and found to be completely satisfactory for the accomplishment of the above objects; and while we have shown a preferred embodiment thereof, we wish it to be specifically understood that the same may be modified without departure from the scope and spirit of the appended claims.

What we claim is:

1. A parts washer comprising an open-topped cabinet, a sump containing cleaning solution and defined by the lower portion of said cabinet, an open-topped washing container disposed above said sump and adapted to contain a portion of said cleaning solution for washing dirty machinery parts, a generally tubular cleaning solution distributing element disposed within said washing container, a conduit leading from said sump to said distributing element, pump means interposed in said conduit for recirculating said cleaning solution from said sump, through said distributing element into said container, the cleaning solution overflowing back into said sump, said distributing element being generally U-shaped and defining connected elongated portions disposed on opposite sides of said washing container, one of said elongated portions being disposed adjacent the top of one side of said container and the other of said elongated portions being disposed adjacent the bottom of the other side of said container, said elongated portions being connected at corresponding ends to a transversely inclined portion of said distributing element, said elongated portions of said distributing element defining longitudinally spaced cleaning solution outlet orifices which open into said container in a generally horizontally inwardly extending direction so as to create a turbulent agitation of the cleaning solution within said washing container, a rinsing nozzle disposed adjacent the top of said cabinet, valve means interposed in said conduit, secondary conduit means connecting said rinsing nozzle to said cleaning solution conduit, and a filter element interposed between said secondary conduit and said valve means, said valve means being movable between a washing position wherein said cleaning solution is recirculated from said sump through said cleaning solution conduit to said washing container and a rinsing position wherein said cleaning solution is recirculated from said sump through said filter element and through said secondary conduit means to said rinsing nozzle, the cleaning solution dispensed from said rinsing nozzle flowing back into said sump, said rinsing nozzle being adapted to discharge filtered cleaning solution over machinery parts in said cabinet.

2. A parts washer comprising an open-topped cabinet, a sump containing cleaning solution and defined by the lower portion of said cabinet, an open-topped washing container disposed above said sump and adapted to contain a portion of said cleaning solution for washing dirty machinery parts, a generally tubular generally U-shaped cleaning solution distributing element disposed within said washing container, a conduit leading from said sump to said distributing element, pump means interposed in said conduit for recirculating said cleaning solution from said sump through said distributing element into said container, the cleaning solution overflowing back into said sump, said distributing element defining connected elongated portions disposed on opposite sides of said washing container, one of said elongated portions being disposed adjacent the top of one side of said container and the other of said elongated portions being disposed adjacent the bottom of the other side of said container, said elongated portions being connected at corresponding ends to a transversely inclined portion of said distributing element, said elongated portions of said distributing element defining longitudinally spaced cleaning solution outlet orifices which open into said container in a generally horizontally inwardly extending direction so as to create a turbulent agitation of the cleaning solution within said washing container, a rinsing nozzle disposed adjacent the top of said cabinet, valve means interposed in said conduit, secondary conduit means connecting said rinsing nozzle to said cleaning solution conduit, and a filter element interposed between said secondary conduit and said valve means, said valve means being movable between a washing position wherein said cleaning solution is recirculated from said sump through said cleaning solution conduit to said washing container and a rinsing position wherein said cleaning solution is recirculated from said sump through said filter element and through said secondary conduit means to said rinsing nozzle, the cleaning solution dispensed from said rinsing nozzle flowing back into said sump, said rinsing nozzle being adapted to discharge filtered cleaning solution over machinery parts in said cabinet, said valve means comprising a two-way valve having an inlet port and two outlet ports, said inlet port being connected to the outlet of said pump means, one of said outlet ports being connected to said distributing element so as to convey non-filtered cleaning solution to said container and the other of said outlet ports leading to said rinsing nozzle so as to convey filtered cleaning solution thereto, and a filter element mount defined by said valve adjacent said other of said outlet ports, and said other of said outlet ports being constructed so as to bypass said cleaning solution through said filter element before said cleaning solution is conveyed to said rinsing nozzle.

References Cited in the file of this patent

UNITED STATES PATENTS

| | | |
|---|---|---|
| 417,832 | McCausland | Dec. 24, 1889 |
| 1,714,888 | Perkins | May 28, 1929 |
| 2,425,848 | Vawter | Aug. 19, 1947 |
| 2,653,617 | Zaber | Sept. 29, 1953 |
| 2,860,646 | Zucker | Nov. 18, 1958 |